United States Patent
Morin et al.

(10) Patent No.: US 12,181,074 B2
(45) Date of Patent: Dec. 31, 2024

(54) VALVE PROVIDING SUPPLEMENTAL FEEDBACK DURING OPERATION

(71) Applicant: Badger Meter, Inc., Milwaukee, WI (US)

(72) Inventors: Christian Morin, Mount Pleasant, WI (US); David Vaughn, Union Grove, WI (US); Eric Bunke, Whitefish Bay, WI (US); Jeremy Aderhold, Cedarburg, WI (US); Andrew Perez, Brookfield, WI (US)

(73) Assignee: Badger Meter, Inc., Milwaukee, WI (US)

( * ) Notice: Subject to any disclaimer, the term of this patent is extended or adjusted under 35 U.S.C. 154(b) by 867 days.

(21) Appl. No.: 17/100,220

(22) Filed: Nov. 20, 2020

(65) Prior Publication Data

US 2022/0163121 A1    May 26, 2022

(51) Int. Cl.
*F16K 5/20*      (2006.01)
*F16J 15/32*    (2016.01)
*F16K 5/06*      (2006.01)

(52) U.S. Cl.
CPC ............... *F16K 5/201* (2013.01); *F16J 15/32* (2013.01); *F16K 5/0647* (2013.01)

(58) Field of Classification Search
CPC .. F16K 37/0033; F16K 31/045; F16K 31/055; F16K 5/201; F16J 15/32
See application file for complete search history.

(56) References Cited

U.S. PATENT DOCUMENTS

| | | | |
|---|---|---|---|
| 2,863,629 A | 12/1958 | Knox | |
| 4,538,789 A * | 9/1985 | An | F16K 5/0442 251/248 |
| 5,226,454 A * | 7/1993 | Cabalfin | F16K 31/045 251/129.01 |

(Continued)

FOREIGN PATENT DOCUMENTS

| | | |
|---|---|---|
| CN | 206352668 U | 7/2017 |
| JP | 56113281 U | 9/1981 |

(Continued)

OTHER PUBLICATIONS

Korean Intellectual Property Office International Search Report, Date of Mailing Mar. 3, 2022, 3 pages.

*Primary Examiner* — Kenneth Rinehart
*Assistant Examiner* — Nicole Gardner
(74) *Attorney, Agent, or Firm* — Boyle Fredrickson S.C.

(57) ABSTRACT

A ball valve for use in a hydraulic supply system is described. The ball valve includes a valve body defining a fluid passage including an inlet and an outlet, a ball having an opening therethough and having an open position and a closed position within the fluid passage and a normal operating range between the open position and the closed position, a manual valve operation mechanism, an input shaft connected to the manual valve operation mechanism, and a gearing assembly including an output shaft, the gearing assembly connected to the input shaft and the output shaft connected to the ball. Rotation of the manual valve operation mechanism causes rotation of the ball along a full operating range within the valve body and the gearing assembly includes a feedback mechanism that is actuated after the ball has rotated outside of the normal operating range.

16 Claims, 4 Drawing Sheets

(56) References Cited

U.S. PATENT DOCUMENTS

| | | | |
|---|---|---|---|
| 5,853,130 A | 12/1998 | Ellsworth | |
| 6,079,442 A * | 6/2000 | Raymond, Jr. | F16K 31/055 |
| | | | 74/423 |
| 10,041,420 B2 * | 8/2018 | Feiner | F02D 9/108 |
| 10,066,761 B1 | 9/2018 | Hernu et al. | |
| 10,441,960 B2 | 10/2019 | Rogers et al. | |
| 2011/0042593 A1 * | 2/2011 | Wilby | F16K 31/042 |
| | | | 73/862.08 |
| 2018/0172173 A1 * | 6/2018 | Gross | F16K 31/055 |

FOREIGN PATENT DOCUMENTS

| | | |
|---|---|---|
| JP | 07286678 A | 10/1995 |
| JP | 2003329168 A | 11/2003 |
| WO | 2014067083 A1 | 5/2014 |

\* cited by examiner

VALVE PROVIDING SUPPLEMENTAL FEEDBACK DURING OPERATION

FIELD OF THE INVENTION

This application relates to a valve for use in a hydraulic supply system for controlling the flow of fluid or gases in the system, More specifically, this application relates to a valve that provides supplemental manual feedback during operation.

BACKGROUND

A hydraulic supply system is a system configured to supply a liquid or gas moving in a confined space under pressure. Typical examples of a hydraulic supply system are a city utility water or gas grid, household water pipes, vehicle fluid systems, etc. providing fluid through conduit, pipes, tubes, etc. The system is kept under pressure such that a fluid is delivered as needed at outlets from the supply system such as utility meters, faucets, or other devices, These devices typically have a valve that can be opened or closed such that, when the valve is opened, the fluid under pressure passes through the valve and, when the valve is closed, the fluid is contained in the supply system.

Ball valves and gate valves are two of the typical valves for controlling the flow of fluid in hydraulic systems. Ball valves are generally preferred because such devices allow a user to quickly open or close the valve. Ball valves use a handle to control the placement of a hollow, perforated sphere positioned in the flow in the valve housing, i.e., the ball of the ball valve. When the handle is turned, the hole is moved to or from being parallel to the flow, i.e., fully open, or being perpendicular to the flow, i.e., fully closed. Ball valves are typically more effective at forming a tight seal and have more reliability and longevity than gate valves. They are often used for both shutoff and control applications.

Most ball valves are quick-acting, referred to as a quarter turn ball valve. They typically have a handle that requires only a 90-degree turn to either completely open or close the valve. This type of valve typically includes mechanical stops such that the handle is constrained to operation within the 90-degree radius. When the handle is 90-degrees from being aligned with the conduit, the valve is fully closed, and when the handle is aligned with the conduit, the valve is fully open.

However, although the quarter turn ball valve has the advantage of allowing quick opening and closure, they do have known deficiencies. First, quarter turn ball valves are more likely than gate valves to cause water hammer. When a valve is quickly closed on water moving at high pressure through pipes, it can cause shock waves through the plumbing that create a hammering sound. Under high enough pressure, water hammer can cause a pipe to weaken and break. Second, under high pressure, the amount of force required to turn the handle may be relatively high. Third, ball valves, having only a limited range, provide a highly variable flow rate along the ninety-degree radius reducing the effectiveness of the valve's control function.

Some ball valves are operated by gearing mechanisms. Gearing mechanisms are typically force multipliers that allow the use of a relatively small handwheel or other rotation device to operate a valve with a relatively small operating force, even under high pressures. The gearing further allows finer control over the flow rate through the valve as each turn of the gearing mechanism may be configured to rotate the ball less than it would with a quarter turn valve. The gearing does, however, increase the operating time for the valve. Further, alignment of the hole in the ball is no longer evident based on the handle and it may also be possible to rotate the ball past the fully open or fully closed position without that visual feedback.

Some ball valves contain a swing check located within the ball to restrict the valve to operating within a normal range between fully open and fully closed to address the over rotation issue. However, such valves may be damaged and/or subject to excessive wear when used with a force multiplying gearing mechanism. The force multiplier also increases the force that is applied to the gearing and the swing checks as force is applied once the valve is fully open or fully closed.

What is needed is a ball valve configured to provide a mechanical feedback to a valve handle or wheel when the valve is being operated beyond a fully open position or beyond a fully closed position. What is further needed is such a valve where the amount of feedback being provided increases dependent on the degree past the fully open or fully closed position in which the valve is being operated.

SUMMARY OF THE INVENTION

The present invention is directed to ball valve configured to provide feedback to an operator when the valve is being operated beyond its fully open position and/or its fully closed position. Further, this feedback is provided without preventing the operation beyond its filly open position and/or its fully closed position.

In one more detailed aspect, a ball valve for use in a hydraulic supply system is described. The ball valve includes a valve body defining a fluid passage including an inlet and an outlet, a ball having an opening therethough and having an open position and a closed position within the fluid passage and a normal operating range between the open position and the closed position, a manual valve operation mechanism, an input shaft connected to the manual valve operation mechanism, and a gearing assembly including an output shaft, the gearing assembly connected to the input shaft and the output shaft connected to the ball. Rotation of the manual valve operation mechanism causes rotation of the ball along a full operating range within the valve body and the gearing assembly includes a feedback mechanism that is actuated after the ball has rotated outside of the normal operating range.

In another embodiment of the invention, the feedback mechanism provides mechanical feedback to the manual valve operation mechanism after the ball has rotated outside of the operating range. The amount of feedback may be increased in correlation with the degree the ball has rotated outside of the normal operating range. The amount of feedback may further be a resistance to rotation of the input shaft and the manual valve operation mechanism.

In another embodiment, the feedback mechanism includes one or more cams rotating within the gearing mechanism to actuate the feedback mechanism. The one or more cams may be configured to press into one more O-rings of the feedback mechanism as the ball is rotated outside the normal operating range. The O-rings may be compressible to provide increased rotational resistance as the cams are further rotated into the feedback mechanism.

In another embodiment, the feedback mechanism provides visual feedback indication that the ball is being rotated outside of the normal operating range.

In another more detailed aspect, a valve for a hydraulic supply system is described. The valve includes a valve body defining a fluid passage including an inlet and an outlet, a valve having an open position and a closed position within the fluid passage and a normal operating range between the open position and the closed position, a manual valve operation mechanism, an input shaft connected to the manual valve operation mechanism, and a gearing assembly including an output shaft, the gearing assembly connected to the input shaft and the output shaft connected to the valve. Actuation of the manual valve operation mechanism causes actuation of the valve along a full operating range within the valve body and the gearing assembly includes a feedback mechanism that is actuated after the valve has been operated outside of the normal operating range.

Other aspects of the invention, besides those discussed above, will be apparent to those of ordinary skill in the art from the description of exemplary embodiments which follows. In the description, reference is made to the accompanying drawings, which form a part hereof, and which illustrate examples of the invention.

DETAILED DESCRIPTION OF THE INVENTION

The present application is directed to a valve that provides feedback during manual operation when the valve is being operated beyond its fully open and/or its fully closed position. For simplicity, the valve is described as a ball valve herein. More particularly, a ball valve in accordance with the present invention does not use check stops to prevent such operations, but rather allows the operation beyond its fully open and/or its fully closed position while providing feedback indicating the occurrence.

Figure 1:
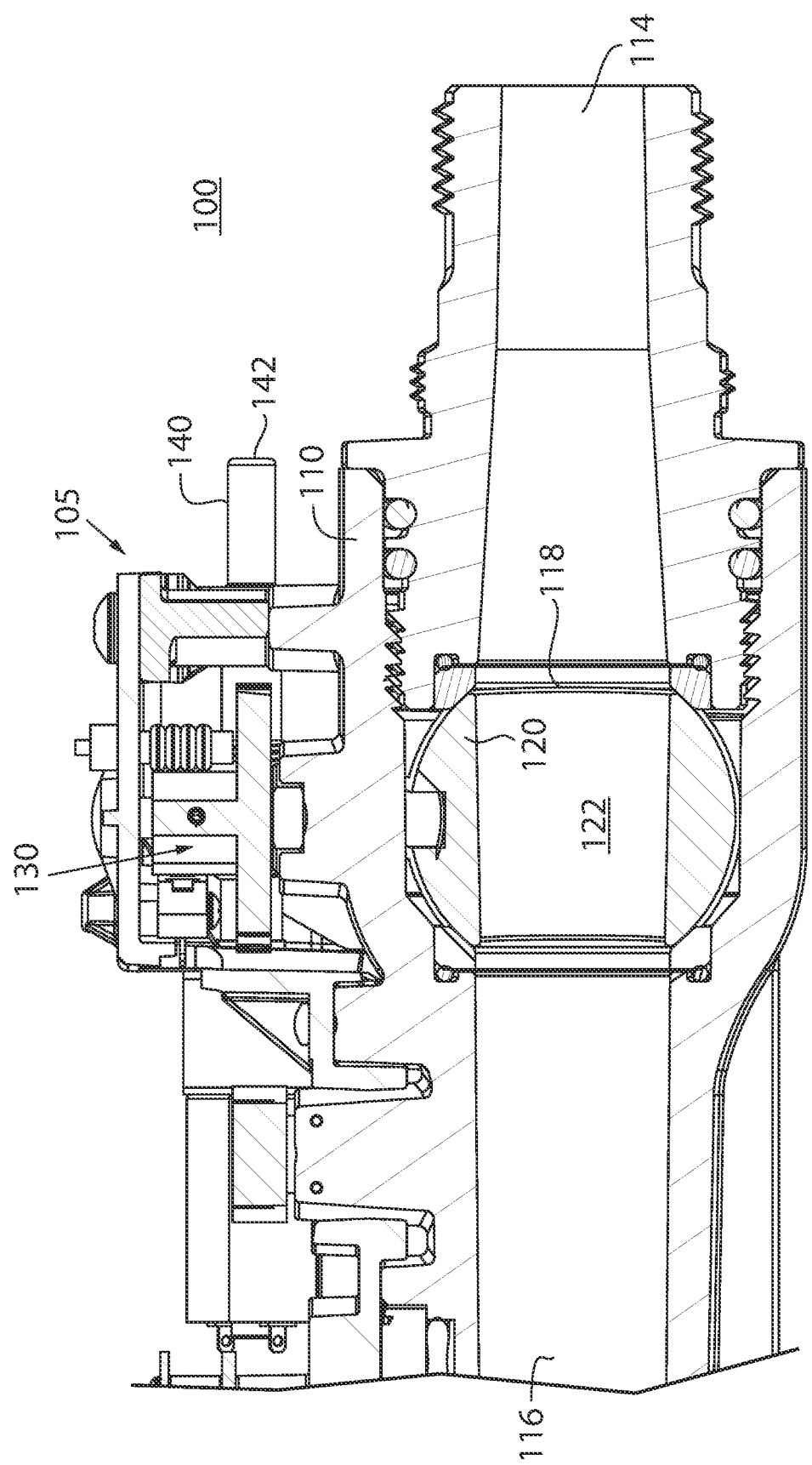
FIG. 1 is a perspective view of a hydraulic supply system including a ball valve, according to an exemplary embodiment.

Referring first to FIG. 1, a portion of a hydraulic supply system 100 including a ball valve 105 is shown, according to an exemplary embodiment. The hydraulic system 100 may include conduit, metering systems, etc. The hydraulic system 100 may be a utility supply system, water pipes for a residence, conduit within a device or vehicle, etc. Ball valve 105 may be included in a component, such as a utility metering monitoring system for use in the hydraulic system 100.

Figure 2:
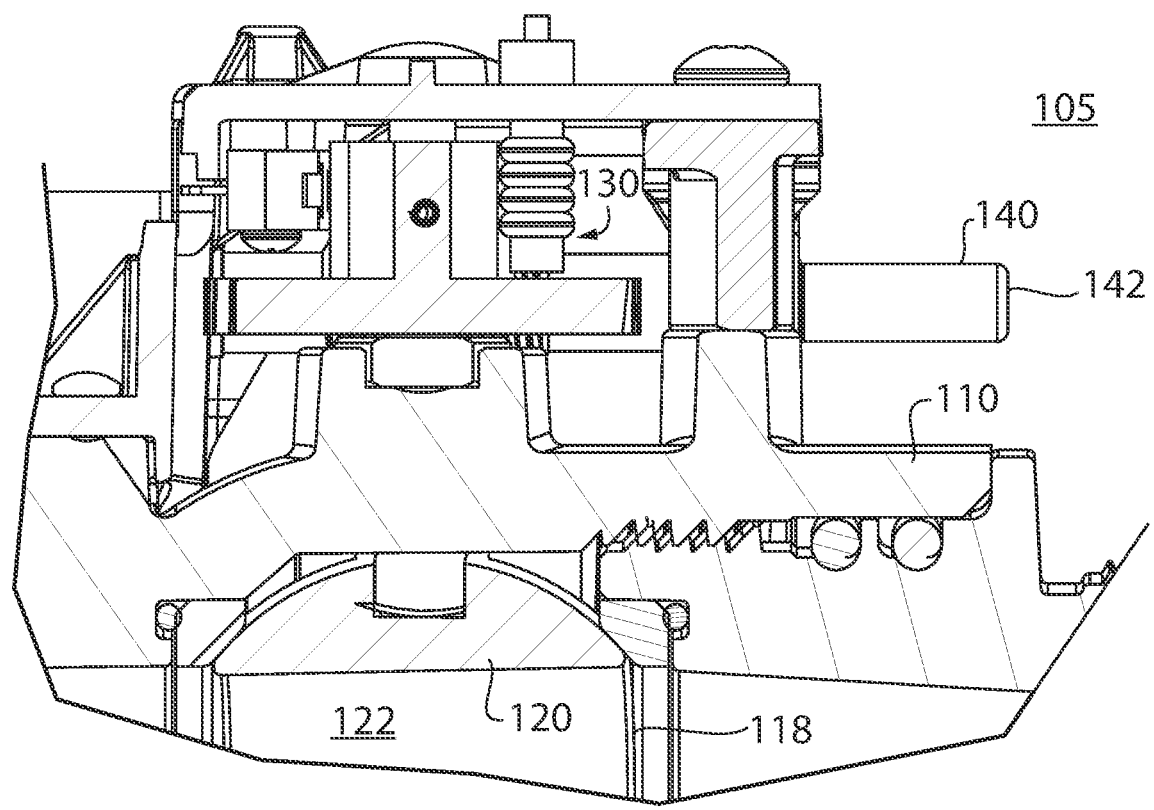
FIG. 2 is top down view of the gearing assembly of the ball valve of FIG. 1, according to an exemplary embodiment.

Referring now also to FIG. 2, an enlarged view of the ball valve 105 is shown, according to an exemplary embodiment. Ball valve 105, includes a valve body 110, a ball 120, a gearing mechanism 130 and a manual valve operation mechanism 140. Although a particular type and configuration of ball valve is shown and described herein, one of ordinary skill in the art should understand that the concepts described may be applied to other types of ball valves and/or valves. Ball valve 105 is configured to be used as a control valve in the hydraulic supply system 100. Ball valve 105 controls the amount of fluid or gas passing through the valve body 110 dependent on the rotation of the ball 120 within the valve body 110.

Valve body 110 is a pressure vessel configured to receive fluid or gas from the conduit of a hydraulic supply system through an inlet 114 and to provide the fluid of gas through an outlet 116, depending on the positioning of ball 120 within the valve body 110. Valve body includes a ball chamber 118 configured to receive and allow rotation of the ball 120. The ball chamber 118 is roughly sized to correlate to the size of the ball 120. Although not shown, valve body 110 may be configured to receive ball seats between inlet 114 and ball chamber 118 and between outlet 116 and ball chamber 118. The ball seats, combined with the sizing of the ball chamber 118, may provide compression fits such that fluid or gas cannot pass through ball chamber 118 except through a ball aperture as defined below.

Ball 120 is a ball having an aperture 122 passing entirely through the ball 120 and having an axis that is horizontal when the ball 120 is positioned within valve body 110. The radius and shape of the aperture 122 is generally, but not exclusively, correlated to the radius and shape of the conduits of the hydraulic supply system 100. Accordingly, when the ball 120 is rotated within valve body 110 to be in the fully open position, such that the axis of aperture 122 is aligned with an axis of conduit in the hydraulic supply system, fluid or gas within the hydraulic supply system will pass unimpeded through ball 120 and ball valve 105, When the ball 120 is rotated within valve body 100 to be in the fully closed position, such that the axis of aperture 122 is transverse to an axis of conduit in the hydraulic supply system, fluid or gas within the hydraulic supply system will be blocked from passing through the ball valve 105.

Gearing assembly 130 is an assembly configured to include one or more gears to convert manual rotation of a manual valve operation mechanism 140 to rotation of ball 120, In a preferred embodiment, gearing assembly 130 is force multiplying such that the force required to rotate the manual valve operation mechanism 140 is less than the force imparted to rotate the ball 120, The gearing mechanism is described in further detail below with reference to FIGS. 3 and 4.

The manual valve operation mechanism 140 may be any mechanism that extends from an external location, accessible by an operator, into the valve body 110 to operate the ball valve 105 by rotating the ball 120. In the embodiment shown in FIGS. 1 & 2, mechanism 140 includes a screwdriver receiving slot 142. In alternative embodiments, manual valve operation mechanism 140 may include a wheel, a knob, etc. where rotation of the mechanism will result in rotation of the ball 120 to open and/or close the ball valve 105. In alternative embodiments, the mechanism need not be rotatable and may be any type of mechanism or device whose actuation manually operates the ball valve 105.

Figure 3:
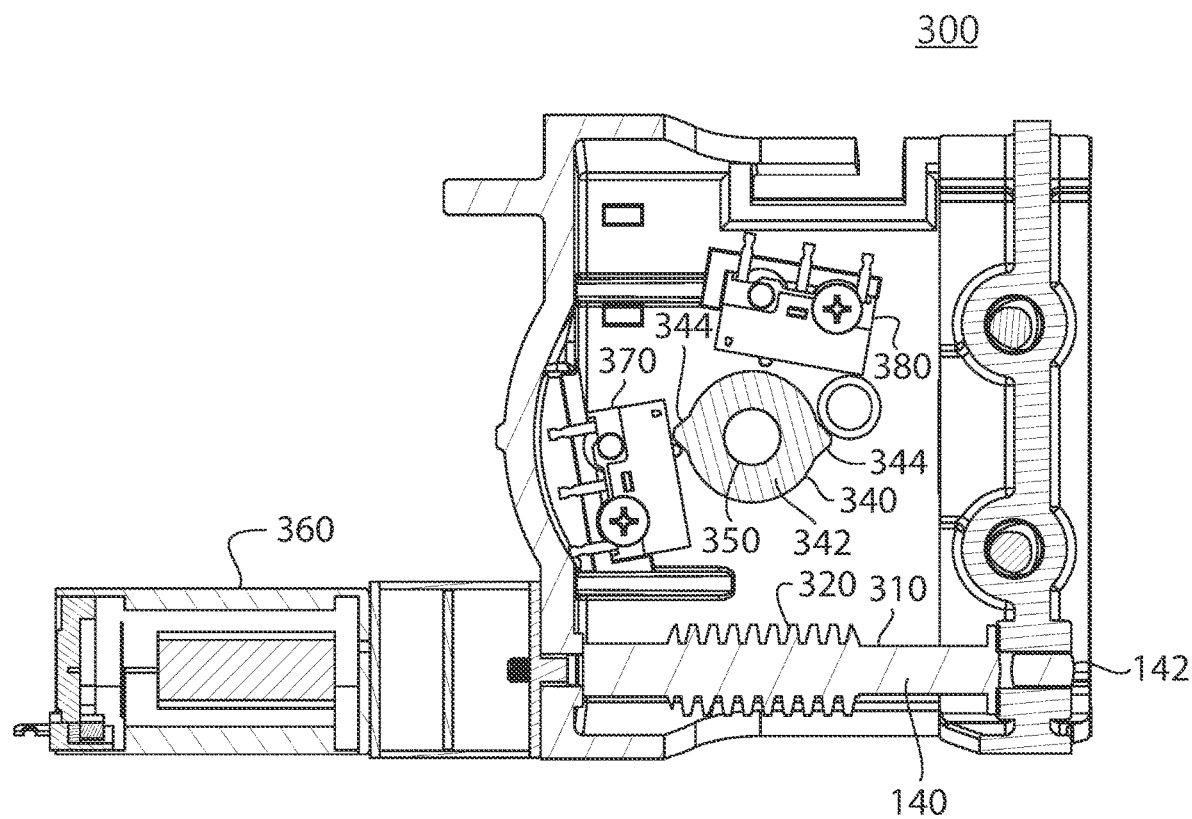
FIG. 3 is a side view of the gearing assembly for the hall valve gear of FIG. 1, according to an exemplary embodiment.
Figure 4:
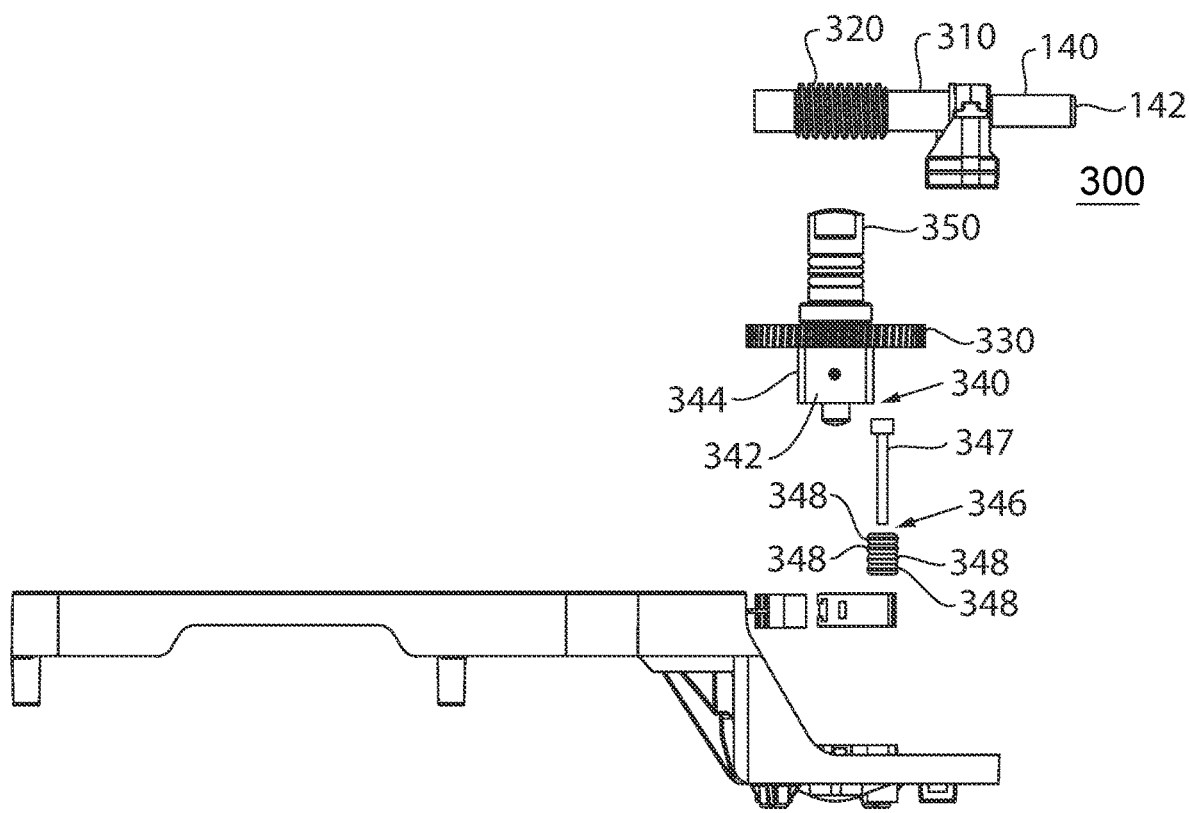
FIG. 4 is an exploded perspective view of the gearing assembly of FIG. 3, according to an exemplary embodiment.

Referring now to FIGS. 3 & 4, a gearing mechanism 300, an exemplary implementation of the gearing mechanism 130 of FIG. 1, is shown in greater detail in the top down view of FIG. 3 and the exploded side view of FIG. 4, according to an exemplary embodiment. During normal operation, valve 105 may be motorized, including components configured to rotate the ball 120 between a fully open and a fully closed position. The 90-degree range between these values is the normal operating range for the valve 105. However, when the motor 360 is operating the valve 105 is this normal operating range, it may be that the motor loses power, etc.

such that the valve must be operated manually using the manual valve operation mechanism 140.

The gearing mechanism 300 is configured to convert an operator's manual input using manual valve operation mechanism 140 into a rotational force applied to ball 120 of the ball valve 105. A particular embodiment of the gearing mechanism is shown, but one of ordinary skill in the art would appreciate that numerous implementations may be alternatively used to provide the advantages described herein.

Gearing mechanism 300 includes an input shaft 310, a worm drive shaft 320, a worm drive gear 330, a feedback mechanism 340, and an output shaft 350. Input shaft 310 is rotated by the manual valve operation mechanism 140 which in turn rotates the worm drive shaft 320 on the input shaft 310. Rotation of the worm drive shaft 320 rotates the worm drive gear 330 and the output shaft 350 affixed to the worm drive gear 330. Output shaft 350 is coupled to the ball 120 such that rotation of the output shaft 350 rotates the ball 120 within the ball valve 105. Feedback mechanism 340 in turn includes a gear column 342, affixed to and rotating with the gear 330. Gear column 342 includes a plurality of feedback cams 344 that extend outward from the column 342 beyond a radius of the column 342.

Referring to FIG. 3, valve 105 includes a motor 360 affixed to an end of the input shaft 310 opposite the manual valve operation mechanism 140. During normal operation, motor 360 rotates input shaft 310 and worm drive shaft 320 to rotate worm drive shaft 320 on the input shaft 310. Rotation of the worm drive shaft 320 rotates the worm drive gear 330 and the output shaft 350 affixed to the worm drive gear 330.

Valve 105 further include a first limit switch 370 and a second limit switch 380. Limit switch 370 and 380 may be used to control the operation of the motor 360 as it rotated the ball 120 through its normal operating range between the fully open and the fully closed positions. The limit switches are used to stop operation of the motor 360. Limit switches 370 and 380 may further be used to provide visual feedback, since as initiating actuation of a green LED indicating that the valve is in a fully open position and/or initiating actuation of a red LED indicating that the valve is in a fully closed position. However, during manual operation of the valve 105 such as when valve 105 is unpowered, limit switches may not be available to provide feedback.

According to an exemplary embodiment, worm drive components 320 and 330 provide a mechanical advantage such that the force required to operate the manual valve operation mechanism 140 is less than the rotational force applied to the ball 120. In the embodiment shown in FIGS. 3 & 4, the worm drive components 320 and 330 provide a 56:1 mechanical advantage. During normal operation, limit switches 370 and 380 will stop operation of the motor 360 such that the ball 120 will operate within its normal operating range. However, during manual operation, the limit switches are not available to provide this restriction. The present invention provides feedback mechanism 340 such that feedback is provided when the ball is being operated outside of its normal operating range while also minimizing the risk of damage to the components of valve 105 that may be caused because of the mechanical advantage.

Referring now to feedback mechanism 340, mechanism 340 includes a gear column 342 which is coupled to and rotates together with the gear 330. Mechanism 340 further includes one or more feedback resistance barriers 346 that include a post 347 and a plurality of O-rings 348 positioned to interfere with the feedback cams 344 during rotation of the column 342. In an exemplary embodiment, O-rings 348 may be formed from ethylene propylene diene monomer (EPDM) rubber having a 70-durometer rating.

Although O-rings are shown and c escribed, the feedback mechanism can include any resistance mechanism, elastomer, etc. The durometer rating and, accordingly, the resistance imparted may further be varied as needed.

Feedback resistance barriers 346, including post 347 and O-rings 348, can be positioned proximate to column 342 such that the barriers will not interfere with the rotation of column 342 but will interfere with cams 344 at defined locations during the rotation of column 342. Specifically, feedback resistance barriers 346 may be configured to interfere with cams 344 when the gear 330 rotates just past the fully open and/or the fully closed position. In the embodiment shown in FIGS. 3 & 4, a single feedback resistance barrier 346 is shown correlated to the fully open position. The resistance barriers are configured to interfere with, but not prevent, rotation of column 342 and input shaft 310 to provide feedback to the feedback mechanism 340. An operator using feedback mechanism 340 will be able to detect increased resistance while operating the mechanism.

In operation, rotation of mechanism 340 and column 342 will bring a cam 344 in contact with a resistance barrier 346 after the ball 120 has rotated past the fully open and/or fully closed position. As a consequence, an operator using the manual valve operation mechanism 140 will feel increased resistance in operating the mechanism. As shown in FIG. 3, the resistance will yet further increase the farther the operator rotates ball 120 past the fully open or the fully closed position. Specifically, the cam 344 will further compress the O-rings 348, providing increased resistance.

However, cams 344 and resistance barriers 346 are configured such that the amount of resistance will plateau short of a resistance that is likely to damage the components of valve 150. Specifically, once a furthest extension of a cam 344 passes the axis of a resistance barrier 346, the amount of resistance will decrease to avoid such damage.

In an alternative embodiment, other types of feedback mechanisms may be used in place of the mechanism shown in the figures and described herein. Another example of a feedback mechanism may include a disc attached to mechanism 340, a second disc attached to input shaft 140 and a spring to provide increasing resistance the farther the ball is rotated past its normal operating range.

In further alternative embodiments, the feedback mechanism may be configured to provide electrical and/or visual feedback once the ball 120 has been rotated outside of its normal operating range. For example, additional cams 344 may be used to trigger the limit switches to actuate a separately powered flashing LED that increases the frequency of the flashes depending on the degree the ball 120 has been rotated outside of its normal operating range. Alternatively, the visual indicator may be a flag, color window, etc.

This has been a description of exemplary embodiments, but it will be apparent to those of ordinary skill in the art that variations may be made in the details of these specific embodiments without departing from the scope and spirit of the present invention, and that such variations are intended to be encompassed by the following claims.

We claim:

1. A ball valve for use in a hydraulic supply system, the ball valve comprising:
  a valve body defining a fluid passage including an inlet and an outlet;
  a ball having an opening therethough and having an open position and a closed position within the fluid passage and a normal operating range between the open position and the closed position and an extended operating range that is entered if the ball valve is rotated past the open position or the closed position;

a manual valve operation mechanism;

an input shaft connected to the manual valve operation mechanism; and a gearing assembly including an output shaft, the gearing assembly connected to the input shaft and the output shaft connected to the ball;

wherein rotation of the manual valve operation mechanism causes rotation of the ball within the valve body;

wherein the gearing assembly includes a feedback mechanism that is actuated after the ball has rotated outside of the normal operating range and into the extended operating range.

2. The ball valve of claim 1, wherein the feedback mechanism provides mechanical feedback to the manual valve operation mechanism after the ball has rotated outside of the normal operating range.

3. The ball valve of claim 2, wherein the amount of feedback increases in correlation with the degree the ball has rotated outside of the normal operating range.

4. The ball valve of claim 3, wherein the amount of feedback is a resistance to rotation of the input shaft and the manual valve operation mechanism.

5. The ball valve of claim 1, wherein the feedback mechanism includes one or more cams rotating within the gearing mechanism to actuate the feedback mechanism.

6. The ball valve of claim 5, wherein the one or more cams are configured to press into one more O-rings of the feedback mechanism as the ball is rotated outside the normal operating range.

7. The ball valve of claim 6, wherein the O-rings are compressible to provide increased rotational resistance as the cams are further rotated into the feedback mechanism.

8. The ball valve of claim 1, wherein the feedback mechanism provides visual feedback indication that the ball is being rotated outside of the normal operating range.

9. A valve for a hydraulic supply system, the valve comprising:

a valve body defining a fluid passage including an inlet and an outlet;

a valve having an open position and a closed position within the fluid passage and a normal operating range between the open position and the closed position and an extended operating range that is entered if the ball valve is rotated past the open position or the closed position;

a manual valve operation mechanism;

an input shaft connected to the manual valve operation mechanism; and a gearing assembly including an output shaft, the gearing assembly connected to the input shaft and the output shaft connected to the valve;

wherein actuation of the manual valve operation mechanism causes actuation of the valve within the valve body;

wherein the gearing assembly includes a feedback mechanism that is actuated after the valve has been operated outside of the normal operating range and into the extended operating range.

10. The valve of claim 8, wherein the feedback mechanism provides mechanical feedback to the manual valve operation mechanism after the valve has passed outside of the normal operating range.

11. The valve of claim 9, wherein the amount of feedback increases in correlation with the degree the valve is being operated outside of the normal operating range.

12. The valve of claim 11, wherein the amount of feedback is a resistance to actuation of the manual valve operation mechanism.

13. The valve of claim 8, wherein the feedback mechanism includes one or more cams rotating within the gearing mechanism to actuate the feedback mechanism.

14. The valve of claim 13, wherein the one or more cams are configured to press into one more O-rings of the feedback mechanism as the valve is being operated outside the normal operating range.

15. The valve of claim 14, wherein the O-rings are compressible to provide increased rotational resistance as the cams are further rotated into the feedback mechanism.

16. The valve of claim 9, wherein the feedback mechanism provides visual feedback indication that the valve is being operated outside of the normal operating range.

* * * * *